US007693053B2

(12) United States Patent  
Terakawa

(10) Patent No.: US 7,693,053 B2
(45) Date of Patent: *Apr. 6, 2010

(54) METHODS AND APPARATUS FOR DYNAMIC REDISTRIBUTION OF TOKENS IN A MULTI-PROCESSOR SYSTEM

(75) Inventor: Hiroaki Terakawa, Kanagawa (JP)

(73) Assignee: Sony Computer Entertainment Inc., Tokyo (JP)

(*) Notice: Subject to any disclaimer, the term of this patent is extended or adjusted under 35 U.S.C. 154(b) by 683 days.

This patent is subject to a terminal disclaimer.

(21) Appl. No.: 11/559,980

(22) Filed: Nov. 15, 2006

(65) Prior Publication Data

US 2008/0112313 A1 May 15, 2008

(51) Int. Cl.
*H04J 1/16* (2006.01)
(52) U.S. Cl. ...................................... 370/230; 370/235
(58) Field of Classification Search ................ 370/229, 370/230, 230.1, 231, 233, 234, 235, 235.1, 370/236, 237; 710/241, 240, 244, 116
See application file for complete search history.

(56) References Cited

U.S. PATENT DOCUMENTS 6,526,491 B2    2/2003  Suzuoki et al.
7,546,405 B2 *  6/2009  Terakawa .................. 710/241

* cited by examiner

*Primary Examiner*—Chi H Pham
*Assistant Examiner*—Alexander Boakye
(74) *Attorney, Agent, or Firm*—Matthew B. Dernier, Esq.; Gibson & Dernier LLP

(57) ABSTRACT

Methods and apparatus provide for: receiving tokens from a plurality of resources, where the tokens are exchange media for permitting a plurality of requesters to access an associated one of the resources for a period of time; allocating the tokens to respective requester groups into which the plurality of requesters have been assigned; receiving requests for one or more of the tokens from one or more of the requesters and granting, from the allocated tokens, one or more of the tokens to the requesters based on token granting criteria; and redistributing unused tokens from one or more requester groups to one or more other requester groups based on priorities assigned to the requester groups; and dynamically altering the priorities assigned to the requester groups when a number of unused tokens of one or more of the requester groups has fallen below a threshold.

24 Claims, 8 Drawing Sheets

| OBJECT | PRIORITY | UNUSED TOKENS |
|---|---|---|
| GROUP 0 | 1 | 10 |
| GROUP 1 | 2 | 14 |
| GROUP 2 | 3 | 8 |

⋮

| GROUP U | 0 | -- |

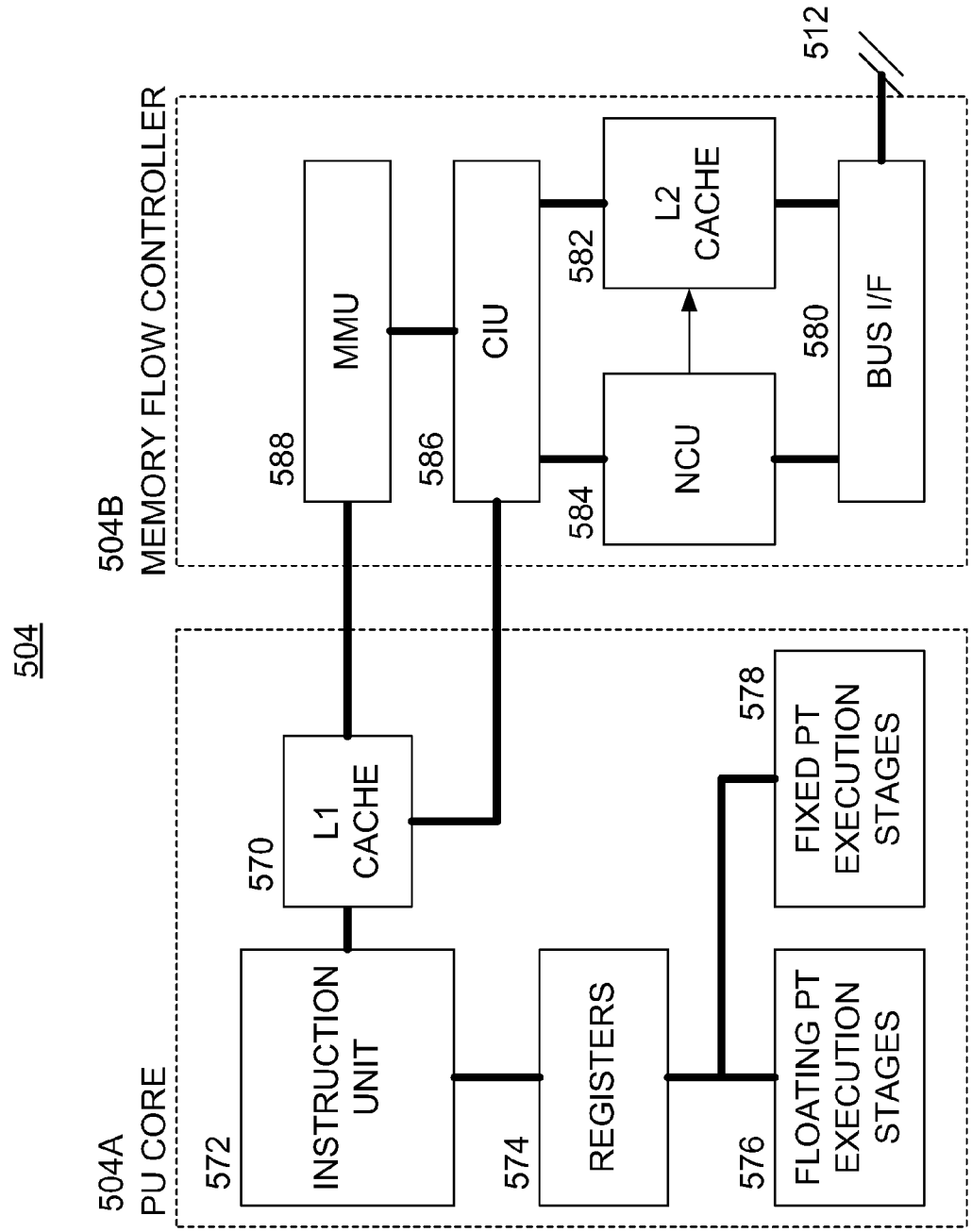

METHODS AND APPARATUS FOR DYNAMIC REDISTRIBUTION OF TOKENS IN A MULTI-PROCESSOR SYSTEM

BACKGROUND

The present invention relates to methods and apparatus for managing the use of a finite number of resources among a plurality of requesters, such as the processors in a multi-processor system. By way of example, the present invention has applicability in a multiprocessor system in which tokens are used to allocate resources among a plurality of requesters.

There is an apparent insatiable desire for faster computer processing data throughputs, for example, because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In some existing multi-processor systems, a plurality of parallel processors may compete for a finite number of resources, such as one or more shared memories, I/O interfaces, etc. Resource management techniques are employed to allocate the resources among the processors for finite periods of time in order to ensure that each processor may use the resources. The conventional approach to managing the allocation of the resources may involve an arbiter of requests for the resources.

The requesters may be the respective processors in a multi-processor and the resources may be memory banks, I/O interfaces, etc. Tokens are mechanisms used to allocate blocks of time during which the requesters may use the resources. Thus, a given resource must obtain a token before it may issue a command (load, store, move, etc.) to a bus over which the resources may be accessed. Upon initialization of the system, the requesters may be assigned to groups (Group 0, Group 1, Group 2, etc.) by way of operating system software (or related software). A Token Manager (TM) receives tokens from the resources (specific sets of which are designated for respective ones of the requester groups), and grants tokens to the requesters on a round robin priority basis. The requesters may request a token on a high/low priority basis; thus, the TM grants the tokens to the requesters on a round robin basis as to high priority token requests and on a round robin basis as to low priority token requests.

Some of the requester groups may have a relatively low number of requesters assigned thereto, and in some cases one or more requester groups may be empty. Nevertheless, in accordance with existing systems, the TM still receives tokens designated for all of the requester groups. Thus, some of the requester groups (particularly the empty ones) may have an excess of tokens. Existing solutions to this inefficient distribution of tokens calls for establishing priorities for the requester groups that dictate the order in which excess tokens are re-distributed to the requester groups. A problem with this approach of token management is that the algorithm for establishing the priorities may be static or extremely slow, thereby resulting in an uneven and inefficient distribution and grant of tokens to the requesters. Indeed, some requester groups may deplete their tokens while others may have an excess of tokens despite having a redistribution algorithm in place. Thus, certain requesters may have to wait for a resource. This is wasteful if another group has one or more available tokens to the resource that are unused.

SUMMARY OF THE INVENTION

In accordance with one or more embodiments of the present invention, the tokens assigned to an empty group (e.g., Group U) are dynamically assigned to the other groups such that a more even distribution of token allocation is achieved in which the requesters are more likely to be granted a token when requested. The invention provides a common controller to which the TM provides information, and which establishes the redistribution of the tokens among the remaining groups on a dynamic basis. The information provided from the TM to the controller may include the number of requests made and tokens granted within the groups. The controller is operable to prioritize the groups based on the request/grant information and then adjust the allocation of the tokens to the groups. The information may indicate to the controller that a given group has drained all of its tokens (or the number of available tokens has fallen below a threshold). Hence, the controller may raise the priority of that group such that it is more likely to receive redistributed tokens. Many other re-allocation algorithms based on the information may also be employed in the alternative.

In accordance with one or more embodiments of the present invention, methods and apparatus provide for: receiving tokens from a plurality of resources, where the tokens are exchange media for permitting a plurality of requesters to access an associated one of the resources for a period of time; allocating the tokens to respective requester groups into which the plurality of requesters have been assigned; receiving requests for one or more of the tokens from one or more of the requesters and granting, from the allocated tokens, one or more of the tokens to the requesters based on token granting criteria; and re-distributing unused tokens from one or more requester groups to one or more other requester groups based on priorities assigned to the requester groups; and dynamically altering the priorities assigned to the requester groups when a number of unused tokens of one or more of the requester groups has fallen below a threshold.

The determination of whether the number of unused tokens has fallen below the threshold may include monitoring a number of requests for tokens from at least one requester group compared to a number of grants of tokens for the at least one requester group. The threshold may be X and the determination that the number of unused tokens has fallen below the threshold may be affirmative when $X \leq$ (requested−granted) tokens. For example, the threshold may be zero.

Alternatively, the determination of whether the number of unused tokens has fallen below the threshold may include monitoring a number of requests for tokens to the requesters of at least one requester group compared to a number of allocated tokens for the at least one requester group. Thus, the threshold may be X and the determination that the number of unused tokens has fallen below the threshold may be affirmative when $X \leq$ (allocated−requested) tokens. For example, the threshold may be zero.

A further alternative is that the determination of whether the number of unused tokens has fallen below the threshold includes monitoring a number of grants for tokens to the requesters of at least one requester group compared to a number of allocated tokens for the at least one requester group. The threshold may be X and the determination that the number of unused tokens has fallen below the threshold is affirmative when X≦(allocated−granted) tokens. Again, the threshold may be zero.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 2 is an illustration a table approach to assigning priority to respective requester groups and monitoring the unused tokens for each group;

FIG. 4 is an illustration of using the table approach of FIG. 2 to re-distribute unused tokens among the requester groups by changing the priority assigned to the groups;

FIG. 8 is a diagram illustrating the structure of an exemplary processing unit (PU) of the system of FIG. 6 that may be adapted in accordance with one or more further aspects of the present invention.

DETAILED DESCRIPTION OF THE PRESENT INVENTION

Figure 1:
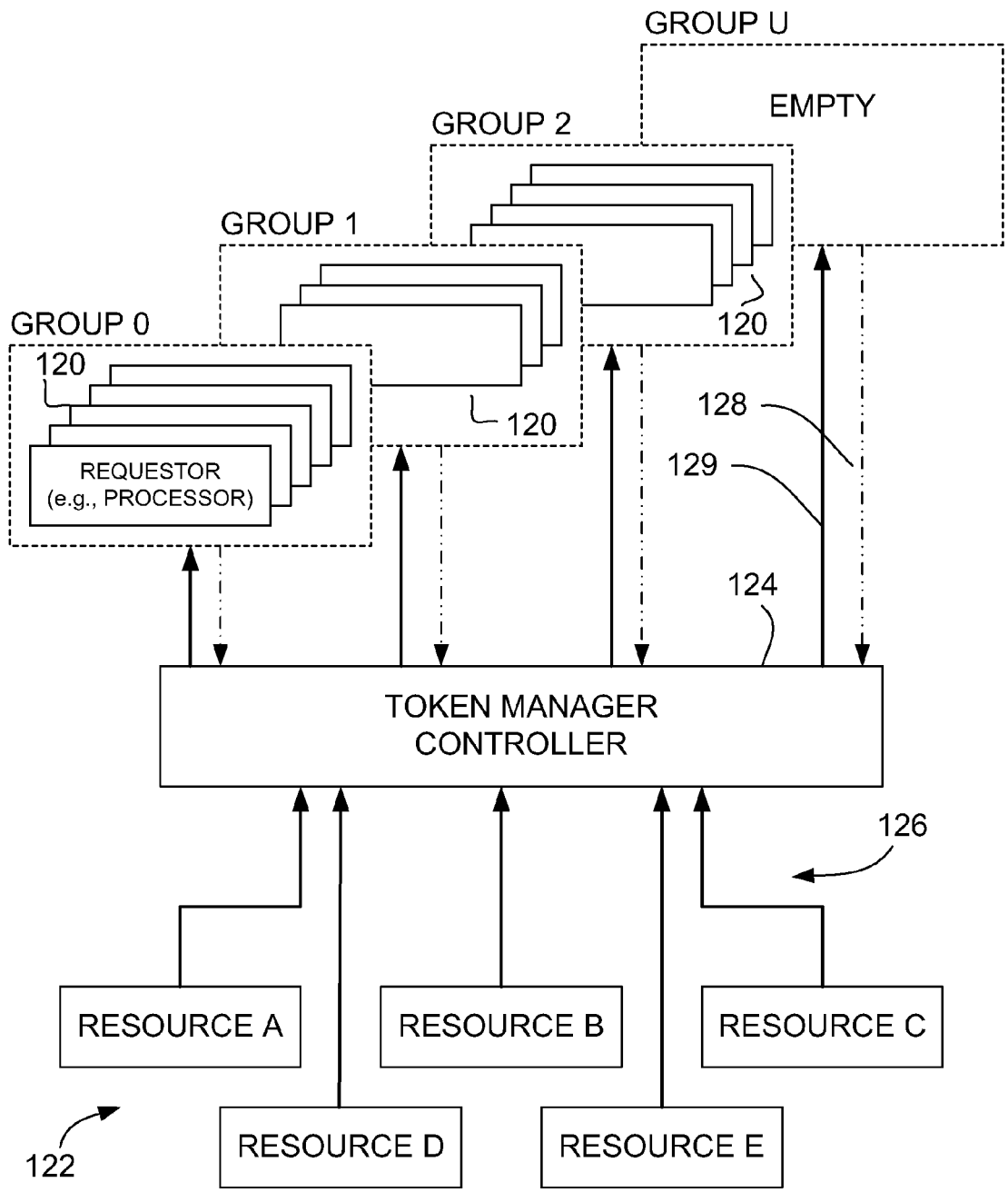
FIG. 1 is a block diagram illustrating the structure of a system having a plurality of requesters and a plurality of resources in which an arbitrator controls the dynamic allocation of the resources among the requesters in accordance with one or more aspects of the present invention.

With reference to the drawings, wherein like numerals indicate like elements, there is shown in FIG. 1 at least a portion of a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The system 100 includes a plurality of requesters 120, which in a preferred embodiment are processors of a multi-processor computing system. The requesters 120 are in operative communication with a plurality of resources 122 contained within or available to the system 100. The resources 122 may include circuits and systems that enable the system 100 to carry out useful functions, which will be discussed in more detail below. The system 100 includes a token manager/controller 124 that is operable to manage the availability of the resources 122 to the requesters 120. Assuming that the requesters 120 are processors of a multi-processor system, such processors may be implemented utilizing any of the known technologies that are capable of requesting data from a memory, and manipulating the data to achieve a desire result. For example, the processors 120 may be microprocessors that are capable of executing operating system and/or application software.

The resources that may be accessed by the requesters (e.g., processors) 120 may include one or more of an external shared memory (e.g., one or more DRAM chips), one or more graphics processors (e.g., an RSX chip or other application specific integrated circuits), one or more south bridges (SB), one or more disc drives and/or interfaces, one or more hard drives and/or interfaces, one or more Blue Tooth modules, one or more 802.11g modules, one or more Ethernet switches, one or more card interfaces, one or more hubs, one or more NAND arrays, and other components.

Although not shown for simplicity, the requesters 120 may communicate with an external DRAM over a Rambus XDR link, and may communicate with the RSX and/or the South Bridge over one or more Rambus RRAC links. The South Bridge may communicate with a number of other resources, such as the graphics chip(s) over a PCI interface link and/or a PCI Express interface. The South Bridge may communicate with the disc drive via a parallel ATA interface, and may communicate with the hard disk drive via a parallel ATA interface (which may be converted into serial interface). The South Bridge may communicate with the Blue Tooth/802.11g modules, the hubs, and the card interface via USB2.0 interfaces. Communication between the South Bridge and the Ethernet switch may be achieved using a GMII interface. The South Bridge may communicate with the NAND array via a starship link. It is noted that the South Bridge may also include a DDR2 interface.

The token manager/controller 124 is shown as a single functional block, it being understood that the functionality of the token manager and controller may be separately implemented depending on the particular design. The token manager/controller 124 is operable to assign each of the plurality of processors 120 to a respective one of a plurality of requester groups GROUP 0, GROUP 1, GROUP 2, GROUP U, etc. The processors 120 may be assigned to the respective requester groups upon initialization of the system 100, for example by operating system software and/or application software. While five requesters 120 are assigned to GROUP 1, three requesters 120 to GROUP 2, and four requesters 120 to GROUP 3, there are no requesters 120 assigned to GROUP U.

The token manager/controller 124 preferably operable to receive tokens from the plurality of resources 122 on communication lines 126 and to allocate the tokens to the respective requester groups (e.g., on lines 129) based on token allocation criteria. The allocation criteria may dictate that a fixed number of tokens be periodically allocated to each of the requester groups. The token manager/controller 124 is also operable to receive requests for the tokens from one or more of the processors 120 (e.g., on lines 128) and grant, from the allocated tokens, one or more of the tokens to the processors 120 based on granting criteria, and (v) re-distribute unused tokens from one or more requester groups to one or more other requester groups based on priorities assigned to the requester groups.

As will be discussed in more detail below, the token manager/controller 124 preferably operable to dynamically assign the unused tokens of GROUP U (and/or other groups)

to the other groups needing tokens such that a more even distribution of token allocation is achieved in which the requesters are more likely to be granted a token when requested.

Tokens are an exchange medium (or mechanism, such as a software mechanism) for permitting one of the processors 120 having the token to access an associated one of the resources 122 for a particular period of time. Thus, a token is the mechanism used to allocate a block of time for a resource 122 to be used by a requester 120.

In one or more embodiments, one token must be obtained for every read or write access. Before using any resource 122, a requester 120 preferably must obtain a token for the specific resource 122. Tokens are considered to be consumed when the operation that required the token has been initiated on one or more of the buses interconnecting the requesters (processors) 120 and the resources 122. As an alternative, the requester 120 may assume that the token is retained if an operation on the bus is retried. Preferably, a token is specific to a resource 122, i.e., a token for one resource 122 is preferably not usable in place of a token for another resource 122. In one or more embodiments, the requesters 120 may request only one token per resource 122, although some exceptions may exist.

In one or more embodiments, the token manager/controller 124 may grant tokens at a programmable rate to each requester group. By way of example, when software performs a load or store that requires a memory access or performs a DMA operation to memory or I/O, the group or processor 120 (requester) makes a token request to the token manager/controller 124 and identifies its requester group and the resource 122 to be used. In alternate embodiments, non-processors may be requesters 120, such as when an I/O device makes an access to a resource 122. In such a case, an I/O controller makes a token request to the token manager/controller 124 identifying the resource 122 to be used.

The token manager/controller 124 receives requests for tokens from all the requesters 120 and grants tokens. Every cycle a physical requester 120 might request a token. Tokens are preferably granted at a configurable (programmable) rate and, therefore, the token request is preferably latched by the token manager/controller 124 and potentially granted at a later time. The token manager may track the plurality of requesters 120, the plurality of resources 122, and the requester groups. For example, the token manager/controller 124 may record high priority requests for each resource 122 and low priority requests for each resource 122. The token manager/controller 124 may employ allocation registers and rate decrementors to determine how often and exactly when to grant tokens. The token manager/controller 124 may uses token available latches to record when tokens are available for the requester groups. The token manager/controller 124 may have round-robin pointers per priority, per resource and per requester group to track which of multiple requesters 120 in a given requester group should be granted a token on a round-robin basis. For available tokens that are not used by a requester group (and that may be granted to other requesters in other groups), the token manager/controller 124 may have a priority register to define the other groups' priority orders in obtaining these unused available tokens.

The token manager/controller 124 may use the allocation registers to define the period of time between token generation for a particular requester group and uses the rate decrementors to track the periods of time. The interval values from the allocation registers, along with an implied leading one bit, are loaded into the rate decrementors which are decremented at a rate specific to the resource 122 and at a clock rate established by a programmable prescaler. When a rate decrementor is zero and is to be clocked again, a token becomes available for the associated requester group and the interval value from the appropriate allocation register field, along with an implied leading one bit, is again loaded into the rate decrementor. The token manager/controller may employ a register with enable bits for each of the requester groups to identify which rate decrementors are used.

Reference is now made to FIG. 2, which is an illustration of a table 150 representing an example of how the token manager/controller 124 may assign priorities to the requester groups such that they may receive unused tokens from other groups based on such priority. Thus, for example, the table 150 may include a column of the respective requester groups 120 (objects) requester GROUP 0, requester GROUP 1, requester GROUP 2, . . . requester GROUP U. Another column of the table 150 may be the priority assigned to the associated requester group, where the priority establishes the order in which unused tokens are assigned from one or more groups (such as GROUP U) that have unused tokes to the other groups. Thus, requester GROUP 0 may have a priority of 1, requester GROUP 1 may have a priority of 2, requester GROUP 2 may have a priority of 3, etc. Another column of the table 150 may be the number of unused tokens of the requester group. The initial state of the table 150, may be established upon initialization by operating system and/or application software.

As discussed above, the token manager/controller 124 may allocate the tokens to at least one of the respective requester groups based on token allocation criteria. By way of example, the token allocation criteria may be to allocate a fixed number of tokens to each requester group on a periodic basis. The token manager/controller 124 may grant the tokens to the requesters 120 from the allocated tokens. By way of example, the token grant criteria may include a round robin priority algorithm. A round robin is an arrangement of choosing all elements in a group equally in some rational order, usually from the top to the bottom of a list and then starting again at the top of the list and so on. A simple way to think of round robin is that it is about "taking turns." In a computer system, one method of having different processors take turns using the resources of the system is to limit each process to a certain short time period, then suspending that process to give another process a turn (or "time-slice").

The processors 120 may request tokens on a high/low (or other level) priority basis. Thus, the token manager/controller 124 is operable to grant tokens to a processor 120 of a particular requester group on a round robin basis, where the high priority requests are serviced before low priority requests.

Figure 3:
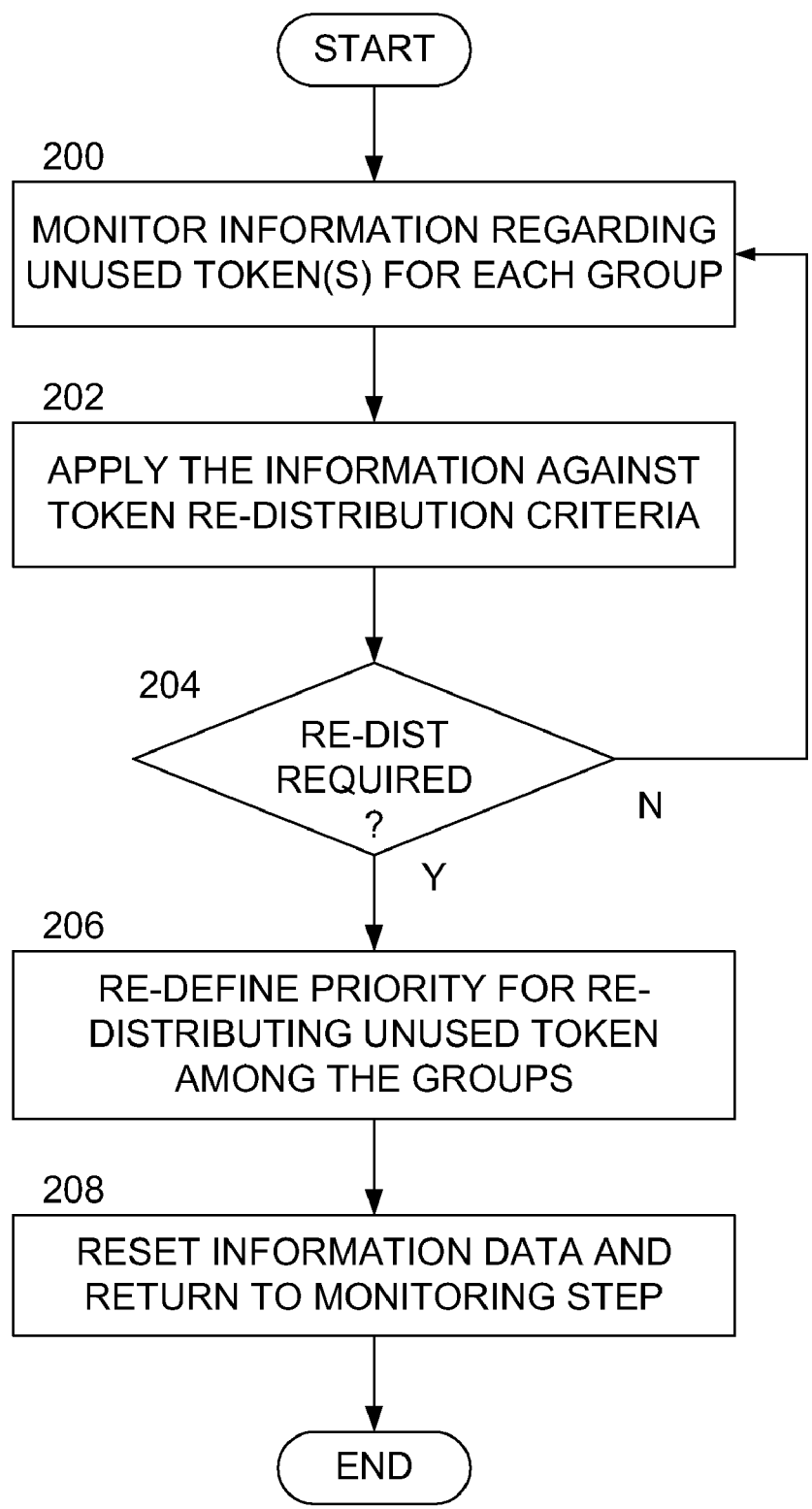
FIG. 3 is a flow diagram illustrating process steps that may be carried out to monitor the allocation of the resources among the requesters and re-distributing unused tokens among the requester groups in accordance with one or more aspects of the present invention.

As a result of the token grant criteria, whatever it may be, some of the processors 120 may not receive tokens as a result of their token requests. This may occur, for example, when the fixed number of allocated tokens to a particular requester group is insufficient to satisfy all of the requests for tokens from the requesters 120 of that requester group. The token manager/controller 124 is preferably operable to dynamically assign unused tokens of one or more groups to one or more groups needing tokens on a priority basis such that a more even distribution of token allocation is achieved. In this regard, reference is now made to FIG. 3, which is a flow diagram illustrating process steps that may be carried out by the token manager/controller 124.

At Action 200, the token manager/controller 124 monitors information regarding unused tokens for each requester group. By way of example, the information may include one or more of the number of requests for tokens from the requester groups, the number of allocated tokens for the requester groups, the number of grants of tokens for the requester groups, etc. At Action 202, the token manager/controller 124 may apply the information against re-distribution criteria and at Action 204, a determination is made as to whether re-distribution is required. By way of example, the re-distribution criteria may include determining whether a number of unused tokens of one or more of the requester groups has fallen below a threshold—and if so, dynamically altering the priorities assigned to the requester groups (action 206) such that unused tokens are allocated to the groups needing them.

Figure 4:
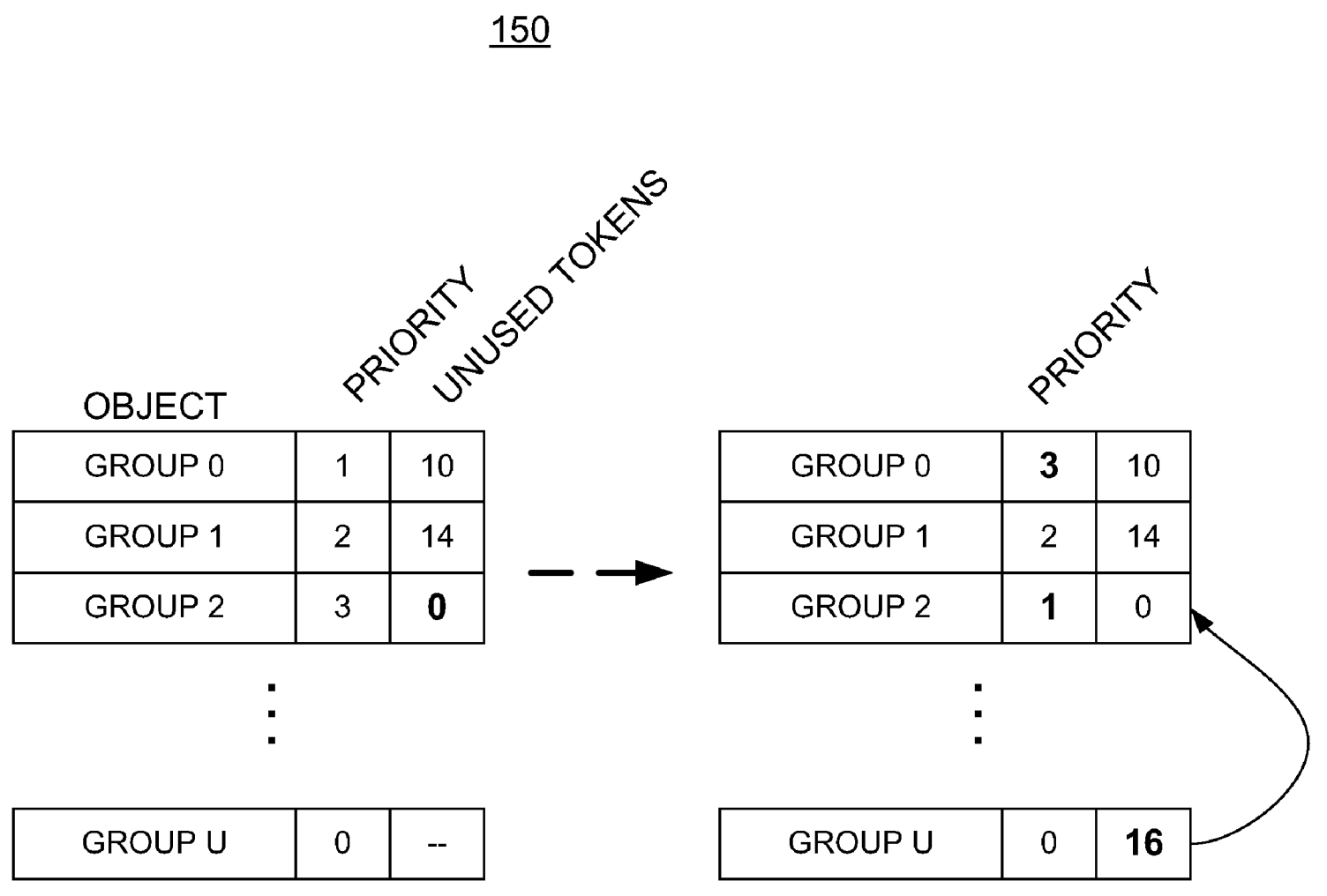

With reference to FIG. 4, the token manager/controller 124 may be operable to make the determination as to whether the number of unused tokens has fallen below the threshold. There are a number of algorithms that may be carried out for this purpose. For example, the number of requests for tokens from at least one requester group may be compared to a number of grants of tokens for the at least one requester group. If the threshold is X, the determination that the number of unused tokens has fallen below the threshold may be considered affirmative when $X \leq$ (requested−granted) tokens. In an alternative example, a number of requests for tokens to the requesters of at least one requester group may be compared to a number of allocated tokens for the at least one requester group. Again, assuming that the threshold is X, the determination that the number of unused tokens has fallen below the threshold may be considered affirmative when $X \leq$ (allocated−requested) tokens. In still a further alternative example, a number of grants for tokens to the requesters of at least one requester group may be compared to a number of allocated tokens for the at least one requester group. Assuming that the threshold is X, the determination that the number of unused tokens has fallen below the threshold may be considered affirmative when $X \leq$ (allocated−granted) tokens.

At action 206, the priorities assigned to one or more of the groups are changed to reflect the needs for tokens as determined by the token manager/controller 124. For example, in the table 150 of FIG. 2, GROUP 2 had 8 unused tokens and a priority for allocation of unused tokens of 3 (a lower priority than GROUP 0 or GROUP 1). With reference to FIG. 4, after some processing has taken place the processors 102 of GROUP 2 may have depleted all of their tokens. Thus, the token manager/controller 124 determines that a re-distribution of unused tokens needs to take place (actions 202-204) and dynamically adjusts the priority of the requester groups (action 206). By way of example then, GROUP 3 may go to a priority of 3 and GROUP 2 may go to a priority of 1. This may permit the re-distribution of unused tokens from GROUP U to GROUP 2 before re-distribution of such tokens to any other group with a lower priority.

Once the re-distribution has taken place, the token manager/controller 124 may reset certain of the information (e.g., the information contained in the table 150) at action 208 and return to the monitoring step—action 200).

Those skilled in the art will appreciate that the above described dynamic prioritization and re-distribution of tokens among the requester groups may tend to equalize the quantity and rate of token requests among the requester groups and, therefore, increase the likelihood that a particular requester 120 will be granted a token to a particular resource 122. Those skilled in the art will also appreciate, given the disclosure herein, that other re-distribution criteria may be employed without departing from the spirit and scope of the present invention.

Figure 5:
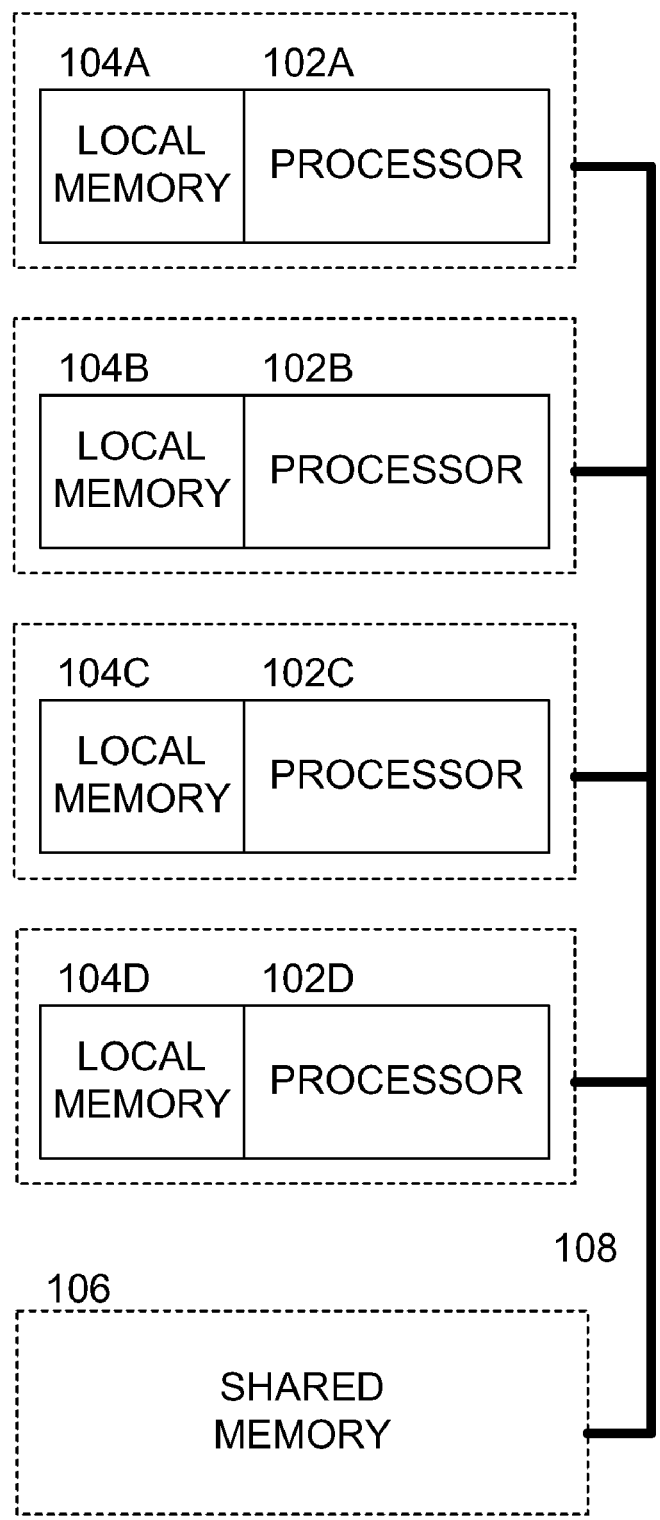
FIG. 5 is a diagram illustrating a multi-processor system that may employ the resource allocation functionality and dynamic grouping functionality in accordance with one or more further aspects of the present invention.

Reference is now made to FIG. 5, which illustrates a multi-processing system 100A that may be adapted to include the above-described dynamic prioritization and token distribution functionality. The processing system 100A includes a plurality of processors 102A, 102B, 102C, and 102D, it being understood that any number of processors may be employed without departing from the spirit and scope of the invention. The processing system 100 also includes a plurality of local memories 104A, 104B, 104C, 104D and a shared memory 106. At least the processors 102, the local memories 104, and the shared memory 106 are preferably (directly or indirectly) coupled to one another over a bus system 108 that is operable to transfer data to and from each component in accordance with suitable protocols.

Each of the processors 102 may be of similar construction or of differing construction. The processors may be implemented utilizing any of the known technologies that are capable of requesting data from the shared (or system) memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

One or more of the processors 102 of the system 100 may take on the role as a main (or managing) processor. The main processor may schedule and orchestrate the processing of data by the other processors.

The system memory 106 is preferably a dynamic random access memory (DRAM) coupled to the processors 102 through a memory interface circuit (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 preferably includes a processor core and an associated one of the local memories 104 in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

Each local memory 104 is coupled to its associated processor core 102 via a bus and is preferably located on the same chip (same semiconductor substrate) as the processor core. The local memory 104 is preferably not a traditional hardware cache memory in that there are no on-chip or off-chip hardware cache circuits, cache registers, cache memory controllers, etc. to implement a hardware cache memory function. As on chip space is often limited, the size of the local memory may be much smaller than the shared memory 106.

The processors 102 preferably provide data access requests to copy data (which may include program data) from the system memory 106 over the bus system 108 into their respective local memories 104 for program execution and data manipulation. The mechanism for facilitating data access may be implemented utilizing any of the known techniques, for example the direct memory access (DMA) technique. This function is preferably carried out by the memory interface circuit.

A description of a preferred computer architecture for a multi-processor system will now be provided that is suitable for carrying out one or more of the inventive features discussed hereinabove. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 6:
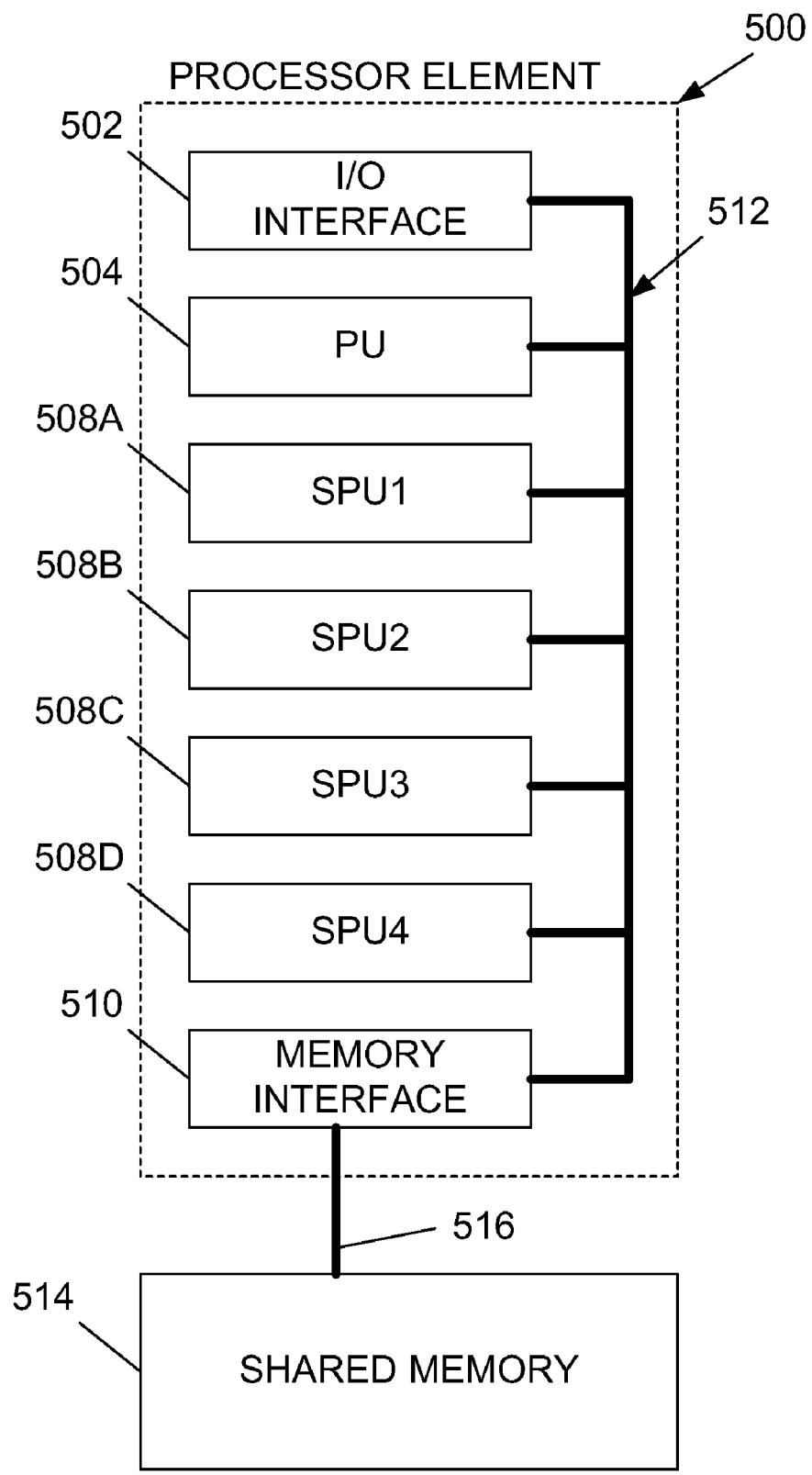
FIG. 6 is a diagram illustrating a preferred processor element (PE) that may be used to implement one or more further aspects of the present invention.

With reference to FIG. 6, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 7:
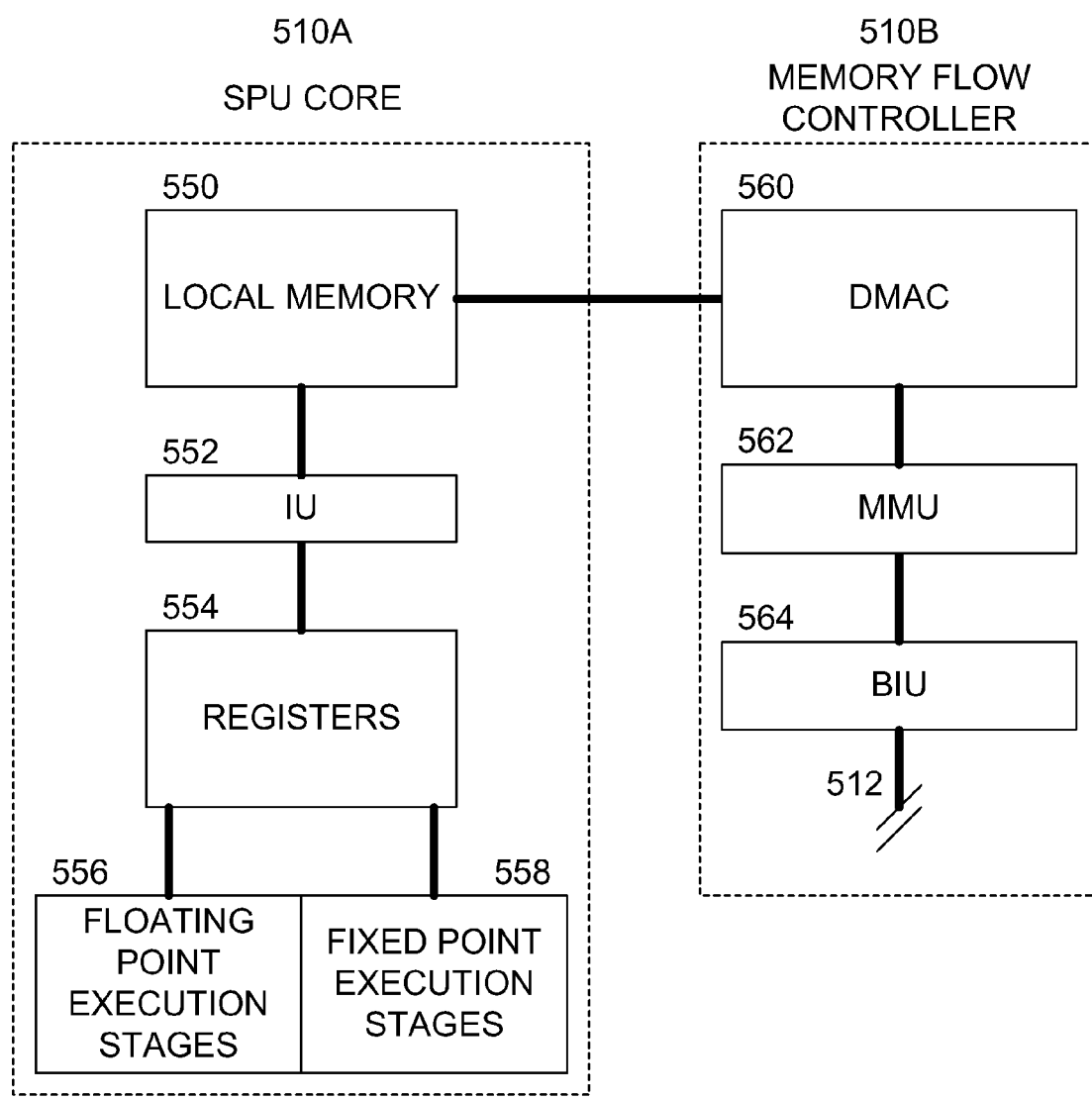
FIG. 7 is a diagram illustrating the structure of an exemplary sub-processing unit (SPU) of the system of FIG. 6 that may be adapted in accordance with one or more further aspects of the present invention.

FIG. 7 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application) The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1 M-, and 16 M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

FIG. 8 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queuing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   receiving tokens from a plurality of resources, where the tokens are exchange media for permitting a plurality of requesters to access an associated one of the resources for a period of time;
   allocating the tokens to respective requester groups into which the plurality of requesters have been assigned;
   receiving requests for one or more of the tokens from one or more of the requesters and granting, from the allocated tokens, one or more of the tokens to the requesters based on token granting criteria; and
   re-distributing unused tokens from one or more requester groups to one or more other requester groups based on priorities assigned to the requester groups; and
   dynamically altering the priorities assigned to the requester groups when a number of unused tokens of one or more of the requester groups has fallen below a threshold.

2. The method of claim 1, wherein a determination of whether the number of unused tokens has fallen below the threshold includes monitoring a number of requests for tokens from at least one requester group compared to a number of grants of tokens for the at least one requester group.

3. The method of claim 2, wherein the threshold is X and the determination that the number of unused tokens has fallen below the threshold is affirmative when $X \leq$ (requested−granted) tokens.

4. The method of claim 2, wherein the threshold is zero.

5. The method of claim 1, wherein a determination of whether the number of unused tokens has fallen below the threshold includes monitoring a number of requests for tokens to the requesters of at least one requester group compared to a number of allocated tokens for the at least one requester group.

6. The method of claim 5, wherein the threshold is X and the determination that the number of unused tokens has fallen below the threshold is affirmative when $X \leq$ (allocated−requested) tokens.

7. The method of claim 5, wherein the threshold is zero.

8. The method of claim 1, wherein a determination of whether the number of unused tokens has fallen below the threshold includes monitoring a number of grants for tokens to the requesters of at least one requester group compared to a number of allocated tokens for the at least one requester group.

9. The method of claim 8, wherein the threshold is X and the determination that the number of unused tokens has fallen below the threshold is affirmative when $X \leq$ (allocated−granted) tokens.

10. The method of claim 8, wherein the threshold is zero.

11. The method of claim 1, wherein the token granting criteria includes granting token requests based on a priority of the requests for tokens.

12. The method of claim 1, wherein the token granting criteria includes granting token requests on a round robin basis.

13. An apparatus comprising: a plurality of parallel processors operating to communication with a plurality of resources; a token manager circuit operable to: (i) receive tokens from a plurality of resources, where the tokens are exchange media for permitting a plurality of processors to access an associated one of the resources for a period of time; (ii) allocate the tokens to respective requestor groups into which the plurality of processors have been assigned; (iii) receive requests for the tokens from one or more of the processors, and (iv) grant, from the allocated tokens, one or more of the tokens to the processors based on token granting criteria, and (v) re-distribute unused tokens from one or more requestor groups to one or more other requestor groups based on priorities assigned to the requestor groups; and a controller circuit operable to dynamically alter the priorities assigned to the requestor groups when a number of unused tokens of one or more of the requestor groups has fallen below a threshold.

14. The apparatus of claim 13, wherein the controller circuit is operable to monitor a number of requests for tokens from at least one requester group compared to a number of grants of tokens for the at least one requester group to determine whether the number of unused tokens has fallen below the threshold.

15. The apparatus of claim 14, wherein the threshold is X and the determination that the number of unused tokens has fallen below the threshold is affirmative when $X \leq$ (requested−granted) tokens.

16. The apparatus of claim 14, wherein the threshold is zero.

17. The apparatus of claim 13, wherein the controller circuit is operable to monitor a number of requests for tokens to the requesters of at least one requester group compared to a number of allocated tokens for the at least one requester group to determine whether the number of unused tokens has fallen below the threshold.

18. The apparatus of claim 17, wherein the threshold is X and the determination that the number of unused tokens has fallen below the threshold is affirmative when X≦(allocated−requested) tokens.

19. The apparatus of claim 17, wherein the threshold is zero.

20. The apparatus of claim 13, wherein the controller circuit is operable to monitor a number of grants for tokens to the requesters of at least one requester group compared to a number of allocated tokens for the at least one requester group to determine whether the number of unused tokens has fallen below the threshold.

21. The apparatus of claim 20, wherein the threshold is X and the determination that the number of unused tokens has fallen below the threshold is affirmative when X≦(allocated−granted) tokens.

22. The apparatus of claim 20, wherein the threshold is zero.

23. The apparatus of claim 13, wherein the token granting criteria includes granting token requests based on a priority of the requests for tokens.

24. The apparatus of claim 13, wherein the token granting criteria includes granting token requests on a round robin basis.

* * * * *